UNITED STATES PATENT OFFICE.

JAMES HENDERSON, OF NEW YORK, N. Y., ASSIGNOR TO CHARLES G. FRANCKLYN, OF SAME PLACE.

FURNACE-LINING.

SPECIFICATION forming part of Letters Patent No. 265,962, dated October 17, 1882.

Application filed July 29, 1882. (No specimens.)

*To all whom it may concern:*

Be it known that I, JAMES HENDERSON, of the city, county, and State of New York, have made a new and useful invention consisting of an Improvement in Furnace-Linings, of which the following is such full, clear, and exact description as will enable others to understand and make the same.

The lining is made of a compound of fluor-spar and lime or magnesia or magnesian lime, and is adapted to be used as the lining of furnaces or converters used in metallurgical operations. The lime or magnesia or magnesian lime as free from silica as possible should be used, and as soon after taking it from the kiln as possible. This is reduced by grinding it to a flour so fine as to be capable of passing through a sieve of two thousand five hundred meshes to the square inch. Fluor-spar is also pulverized to about the same fineness, and is mixed thoroughly with the lime or magnesia or magnesian lime. This mixture is rammed into the furnace-hearth or converter to be lined, after which heat is applied. In a short time, or by the time the furnace has arrived at a white heat or dazzling white heat, the lining will have set and become hard.

Should cracks appear, more of the mixture may be put in and heat applied and this operation repeated until the hearth becomes tight and will retain the molten iron and cinder; or the mixture may be charged into molds made of cast-steel and be compressed by hydraulic pressure and heated while in the molds to a white heat for about half an hour, when the mass will become solid and hardened, and may be removed when cold from the molds and used as a lining for the furnace. The bricks or forms thus prepared may be heated and set in any suitable furnace giving the required heat.

The proportions of the fluor-spar are five to ten per cent. of the weight of lime, magnesia, or magnesian lime; but the invention is not restricted to these precise proportions, as the quantity of fluor-spar may be increased or decreased, provided it be not used in such quantity as to render the lining easily fusible under the heat to which it is subjected in the furnace, and in my opinion the percentage of fluor-spar should not exceed half the weight of lime, magnesia, or magnesian lime. This proportion forms a refractory material not readily fused by the action of the flame, is readily applied, is cheap, and the portions broken away in the operation of the furnace form a basic slag which becomes incorporated in the charge.

Furnace-hearths, converters, or any vessel in which purifying of iron is carried on may be lined with this compound, and it will be found to form a lining not readily affected by the heat applied.

I do not wish to be understood as claiming a compound of fluor-spar and lime or magnesia or magnesian lime in every proportion as a lining for furnaces, converters, &c., as my present improvement consists in adding to the lime, magnesia, or magnesian lime a portion of fluor-spar sufficient to make the lime cohere together into a mass, and not enough to cause it to act as a reagent.

What I claim as new, and desire to secure by Letters Patent, is—

The furnace-lining consisting of lime compounded with fluor-spar in the proportions and in the manner hereinbefore specified and set forth.

JAMES HENDERSON.

Witnesses:
H. H. BENNER,
JNO. I. RANKIN.